United States Patent
Shen et al.

(10) Patent No.: US 9,756,705 B2
(45) Date of Patent: Sep. 5, 2017

(54) SYSTEMS AND METHODS FOR LIGHTING AND APPLIANCE CONTROL

(71) Applicant: ZHEJIANG SHENGHUI LIGHTING CO., LTD, Jiaxing (CN)

(72) Inventors: Jinxiang Shen, Jiaxing (CN); Chaoqun Sun, Jiaxing (CN); Shengming Deng, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 1 day.

(21) Appl. No.: 14/421,089

(22) PCT Filed: Sep. 3, 2014

(86) PCT No.: PCT/CN2014/085868
§ 371 (c)(1),
(2) Date: Feb. 11, 2015

(87) PCT Pub. No.: WO2015/043366
PCT Pub. Date: Apr. 2, 2015

(65) Prior Publication Data
US 2015/0351203 A1 Dec. 3, 2015

(30) Foreign Application Priority Data
Sep. 25, 2013 (CN) .......................... 2013 1 0442846

(51) Int. Cl.
*H04B 7/00* (2006.01)
*H05B 37/02* (2006.01)
(Continued)

(52) U.S. Cl.
CPC ......... *H05B 37/0272* (2013.01); *G08C 17/02* (2013.01); *G08C 23/04* (2013.01);
(Continued)

(58) Field of Classification Search
None
See application file for complete search history.

(56) References Cited

U.S. PATENT DOCUMENTS 4,885,766 A * 12/1989 Yasuoka ............... H04M 11/007
340/12.3
5,764,393 A * 6/1998 Okamura ............... G08B 5/228
340/7.54
(Continued)

FOREIGN PATENT DOCUMENTS

CN 102087778 A 6/2011
CN 102314764 A 1/2012
(Continued)

*Primary Examiner* — Zhiyu Lu
(74) *Attorney, Agent, or Firm* — Anova Law Group, PLLC

(57) ABSTRACT

The present invention provides an LED lighting device and an LED lighting control system. The LED lighting device includes an LED lighting unit configured to emit light; an LED driving circuit configured to drive the LED lighting unit, the LED driving circuit being connected to the LED lighting unit; an infrared module configured to send infrared signals to an appliance; and a Wi-Fi module configured to receive and send data. The Wi-Fi module is connected to the infrared module, and sends received data to the infrared module. Embodiments consistent with the present disclosure provide integrated control of lighting and appliances.

19 Claims, 2 Drawing Sheets

(51) Int. Cl.
  *G08C 17/02* (2006.01)
  *G08C 23/04* (2006.01)
  *H05B 33/08* (2006.01)
  *H04W 84/12* (2009.01)

(52) U.S. Cl.
  CPC ........... *H05B 33/086* (2013.01); *H04W 84/12* (2013.01); *Y02B 20/48* (2013.01)

(56) References Cited

U.S. PATENT DOCUMENTS

| | | | | |
|---|---|---|---|---|
| 5,963,624 A * | 10/1999 | Pope | ................... | H04M 11/007 348/734 |
| 6,983,306 B1 * | 1/2006 | Sameshima | ............ | G05B 15/02 709/201 |
| 2007/0233285 A1 * | 10/2007 | Yamamoto | .......... | H04L 12/2803 700/28 |
| 2007/0293208 A1 * | 12/2007 | Loh | ....................... | H04L 12/282 455/419 |
| 2009/0121842 A1 * | 5/2009 | Elberbaum | ............ | G08C 17/02 340/10.5 |
| 2009/0239587 A1 * | 9/2009 | Negron | ................ | G06F 3/04883 455/566 |
| 2011/0164878 A1 * | 7/2011 | Ma | ..................... | H04B 10/1149 398/79 |
| 2012/0206245 A1 * | 8/2012 | Uno | ........................ | G08C 17/02 340/12.26 |
| 2013/0165039 A1 * | 6/2013 | Chang | ................... | H04W 88/04 455/7 |
| 2014/0072018 A1 * | 3/2014 | Gou | ......................... | H04B 3/54 375/219 |

FOREIGN PATENT DOCUMENTS

| | | |
|---|---|---|
| CN | 102858060 A | 1/2013 |
| CN | 103108453 A | 5/2013 |
| CN | 103533706 A | 1/2014 |
| CN | 203523094 U | 4/2014 |
| GB | 2486191 A | 6/2012 |

\* cited by examiner

SYSTEMS AND METHODS FOR LIGHTING AND APPLIANCE CONTROL

CROSS-REFERENCES TO RELATED APPLICATIONS

This application claims the priority of Chinese Patent Application No. 201310442846.6 filed on Sep. 25, 2013, the entire contents of which is incorporated herein by reference.

FIELD OF THE DISCLOSURE

The present disclosure relates to the field of light emitting diode (LED) technologies and, more particularly, relates to a wireless LED lighting device, a wireless lighting control system, and a method for controlling lighting and appliances.

BACKGROUND

Wi-Fi technologies can provide wireless connections for smart terminals such as personal computers, handsets, etc. LED technologies promote energy conservation. LED technologies are also environmentally friendly. Further, LED technologies provide controllable lighting, solid-state lighting, and lighting devices with long lifespans. To promote low carbon living and protect environment, LED technologies have been widely adopted in various lighting applications.

There is an increasing demand for wireless and remote control of household appliances. Currently, "black appliances" have been rapidly updated with new technologies. New "black appliances," such as Samsung's smart television with Wi-Fi access, support wireless remote control through Wi-Fi connections. In contrast, "white appliances" with long lifespans often may not have incorporated recent technologies. As a result, controlling some conventional "white appliances" wirelessly has been a difficult issue. For example, a conventional air conditioning unit may only support the infrared remote control, which requires handheld user operations. Further, the transmission of infrared signal is directional and can be blocked by interior walls and other objects. Moreover, because control devices crossing all appliances are often not compatible, it is difficult to use one universal remote control to control all appliances.

The disclosed method and system are directed to solve one or more problems set forth above and other problems.

BRIEF SUMMARY OF THE DISCLOSURE

Embodiments consistent with the present disclosure provide a wireless LED lighting device combining a Wi-Fi control and an infrared control to provide integrated control of lighting and appliances.

One aspect of the present disclosure provides an LED lighting device with lighting and appliance control capabilities. The LED lighting device includes an LED lighting unit configured to emit light; an LED driving circuit configured to drive the LED lighting unit, the LED driving circuit being connected to the LED lighting unit; an infrared module configured to send infrared signals to an appliance; and a Wi-Fi module configured to receive and send data. The Wi-Fi module is connected to the infrared module, and sends received data to the infrared module.

Further, the LED lighting device may receive a command through the Wi-Fi module, convert the command to infrared signals, and send the infrared signals to the appliance. The Wi-Fi module and the infrared module connect through an I2C, UART, SPI, or SDIO interface. The Wi-Fi module may use an external antenna or an internally integrated antenna. Furthermore, the Wi-Fi module connects the LED lighting device to the internet or a local area network and acts as a wireless access point, a gateway, or a repeater. The Wi-Fi module works at 2.4 GHz or 5 GHz.

In addition, the command received by the Wi-Fi module may require an adjustment of a first appliance. The LED lighting device may determine that a second appliance needs to be adjusted based on the adjustment required by the received command. The LED lighting device may also adjust one or more LED lighting units based on the adjustment required by the received command.

Another aspect of the present disclosure provides an LED lighting control system with lighting and appliance control capabilities. The LED lighting control system includes a smart terminal configured to send commands to control LED lighting devices and appliances; one or more appliances configured to receive control signals corresponding to the commands sent by the smart terminal; one or more LED lighting devices configured to receive the commands sent by the smart terminal and convert the commands to infrared signals or other control signals; and a Wi-Fi router configured to receive the commands from the smart terminal and send received commands to the one or more LED lighting devices.

Further, each LED lighting device includes an LED lighting unit configured to emit light; an LED driving circuit configured to drive the LED lighting unit, the LED driving circuit being connected to the LED lighting unit; and a Wi-Fi module configured to receive and send data. Each LED lighting device works as a network node, transmitting signals to other LED lighting devices within its Wi-Fi coverage range. The smart terminal may be a computer, a tablet, or a smart phone with wireless communication capacities and a user interface for controlling lighting and appliances. The one or more appliances may be an air conditioning unit, a television, a DVD player, a set top box, a satellite receiver, a refrigerator, an oven, a dishwasher, or an electric fan.

Another aspect of the present disclosure provides a method for integrated lighting and appliance control implemented by an LED lighting device. The method includes receiving a Wi-Fi command to control LED lighting devices and appliances; converting the Wi-Fi command to infrared signals or other control signals; and sending the infrared signals to one or more appliances. The method further includes adjusting one or more LED lighting units in response to the received Wi-Fi command.

Embodiments consistent with the presented disclosure integrate a Wi-Fi unit and an infrared remote control unit within one wireless LED lighting device, and control the appliances through transforming the received control commands from Wi-Fi signals into infrared control signals. Further, using smart terminals such as a smart phone or computer, the user is able to control different appliances located at different locations. Moreover, the LED lighting device can receive specific lighting and appliance control commands through Wi-Fi networks, e.g., switching lights and appliances on and off, adjusting the brightness, color and color temperature of the lights, etc.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
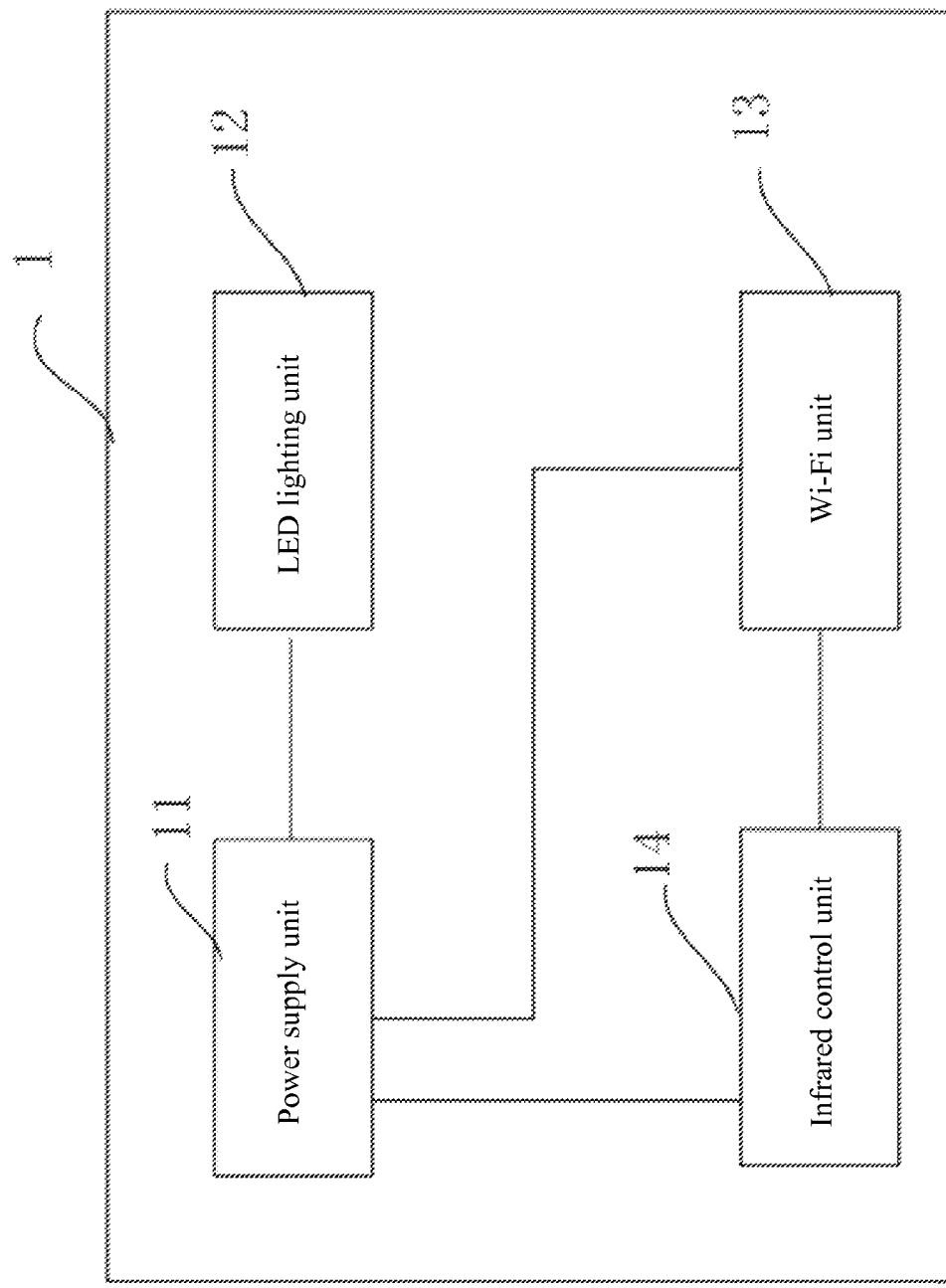
FIG. 1 is a block diagram illustrating exemplary wireless LED lighting device components consistent with the present disclosure.

FIG. 1 shows exemplary wireless LED lighting device components consistent with the present disclosure. As shown in FIG. 1 a wireless LED lighting device 1 includes a power supply unit 11, an LED lighting unit 12, a Wi-Fi unit 13, and an infrared control unit 14. The power supply unit 11 is the power source of the LED lighting device 1. The Wi-Fi unit 13 is electrically connected to the infrared control unit 14. The Wi-Fi unit 13 sends received control commands to the infrared control unit 14. Then, the infrared control unit 14 transforms the commands into infrared signals and sends the signals to the appliances.

Figure 2:
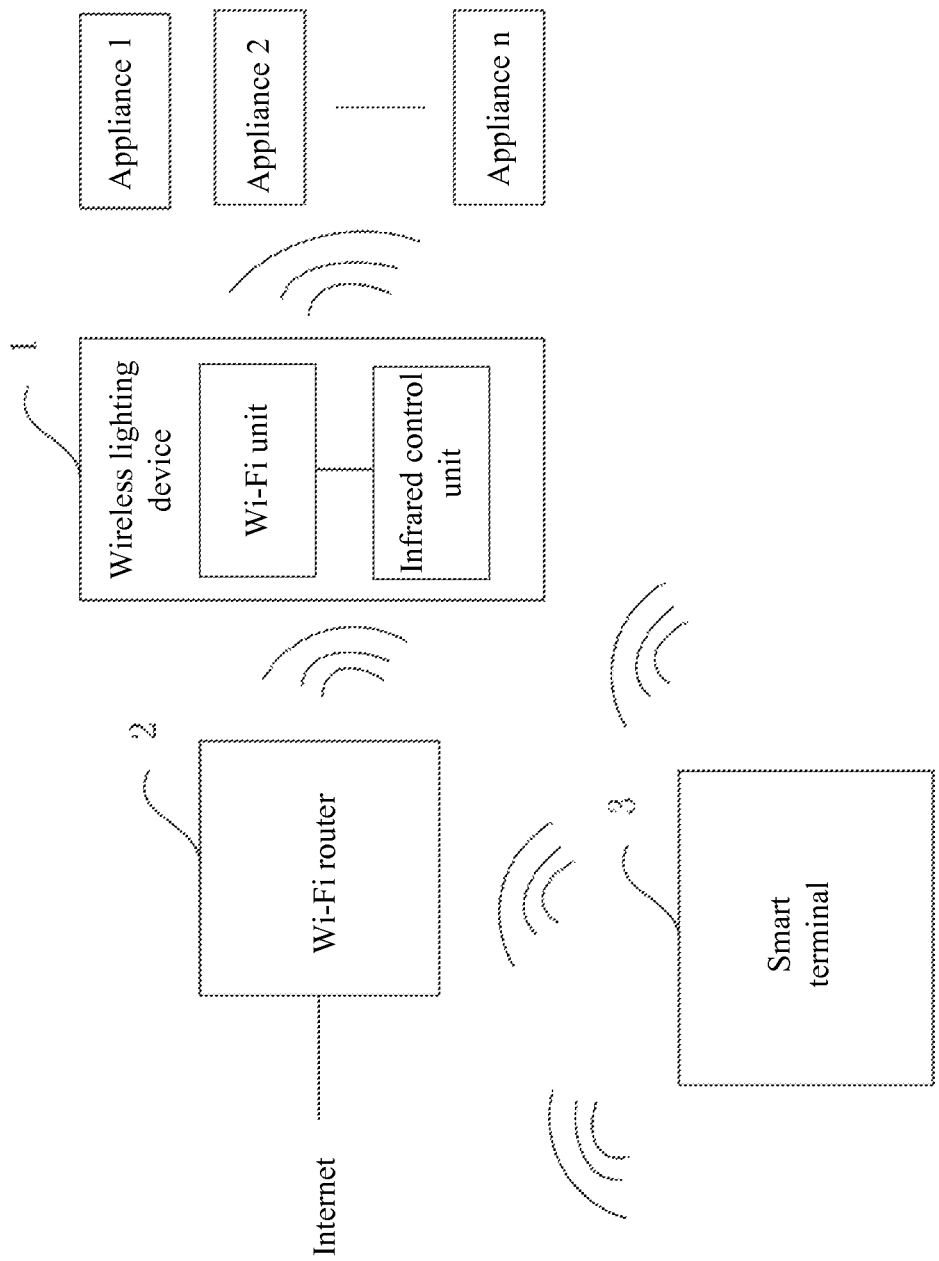
FIG. 2 is a block diagram illustrating an exemplary wireless LED lighting control system consistent with the present disclosure.

As shown in FIG. 2, a wireless LED lighting control system consistent with the present disclosure can simultaneously control multiple appliances, such as Appliance 1 to Appliance n. All the appliances support infrared control. The wireless lighting control system in FIG. 2 includes a wireless lighting device 1, a Wi-Fi router 2, a smart terminal 3, and multiple appliances. The smart terminal 3 may connect to Wi-Fi router 2, connect to the Internet, or connect directly to the Wi-Fi unit 13 of the LED lighting device 1.

When the smart terminal 3 connects to Wi-Fi router 2 directly, the wireless LED lighting device 1 is connected to the wireless network provided by the Wi-Fi router 2 through the Wi-Fi unit 13. In this case, the smart terminal 3 and the Wi-Fi unit 13 are in the same network segment. The smart terminal 3 sends control commands to the Wi-Fi unit 13 in the wireless LED lighting device 1. The Wi-Fi unit 13 resends the commands to the infrared control unit 14. Then the infrared control unit 14 sends the control commands to Appliances 1 to Appliances n after transforming the commands into infrared signals.

When the smart terminal 3 connects to the Internet directly, the Wi-Fi router 2 is connected to the Internet as well. The wireless LED lighting device 1 is connected to Internet wirelessly through Wi-Fi unit 13 and Wi-Fi router 2. In this case, the Wi-Fi router 2 is a gateway. The smart terminal 3 sends control commands to the Wi-Fi router 2 through the Internet and then Wi-Fi router 2 resends the commands to Wi-Fi unit 13. The Wi-Fi unit 13 sends the received control commands to the infrared control unit 14. Then the infrared control unit 14 sends the control commands to the Appliance 1 to Appliance n, after transforming the commands into infrared signals.

If the Wi-Fi unit 13 has routing capacities, then the smart terminal 3 can connect with wireless LED lighting device 1 directly through Wi-Fi unit 13. Through Wi-Fi unit 13, control commands may be sent to the infrared control unit 14. Then the infrared control unit 14 sends the control commands to Appliance 1 to Appliance n, after transforming the commands into infrared signals.

The interface between Wi-Fi unit 13 and the infrared control unit 14 in the wireless LED lighting device 1 may be I2C, UART, SPI, and/or SDIO. The smart terminal 3 may be a mobile phone, a tablet, a desktop computer, an Ultrabook, or a cloud-computing server. The Appliance 1 to Appliance n can be an air conditioning unit, a television set, a DVD player, a set-top box, a satellite TV receiver, an oven, a dishwasher, an electric fan, or any other appliances.

Moreover, in embodiments consistent with the present disclosure, a wireless light control system may include a number of the wireless LED lighting device 1. The specific number can be determined based on specific implementations.

Embodiments consistent with the present disclosure integrate a Wi-Fi unit and an infrared control unit into a wireless LED lighting device. These devices can therefore be used to control the appliances through Wi-Fi signals. The received control commands may be transformed into infrared control signals and sent to the appliances. Consequently, using smart terminals such as a mobile phone or a computer, a user is able to control appliances located in different rooms.

In order to control appliances through a cloud-computing environment, when the wireless lighting device is connected to Internet, a wireless lighting control system consistent with the present disclosure may provide to users with customized software or webpages on smart terminals. As an example, a user may turn on an air conditioning unit before getting home from work using the wireless lighting control system by using an application installed on his smartphone.

By using a wireless lighting control system consistent with the present disclosure, a user does not need to have multiple controllers for different appliances. Moreover, by using the Wi-Fi signals, the wireless LED lighting device can receive specific control commands to control LED lighting units, e.g., switching lights on and off, adjusting the brightness, color and color temperature of the lights, etc.

Embodiments consistent with the present disclosure provide LED lighting devices with Wi-Fi modules. The LED lighting devices may work as repeaters, and may form an ad hoc mesh network. The LED lighting network consistent with the present disclosure may connect to the internet or a local area network. Each LED lighting device in the network may work as a Wi-Fi wireless access point. Users may remotely control LED lighting devices through any of the access points or through a network connection.

In various embodiments, the LED lighting device can be configured as one single device. For example, an LED driving circuit, a LED light controller, a Wi-Fi unit, an infrared control unit, and an LED lighting unit can be integrated to form a single device. Accordingly, the LED lighting control system can include a plurality of the LED lighting devices each configured as one single device.

In an exemplary LED lighting device, to ensure that the Wi-Fi unit functions as desired, an embedded antenna can be included in the integrated LED lighting device. The embedded antenna is configured to fit a shape of the lamp body of the LED lighting device without increasing size of the resultant device and to maintain the design of the resultant device. In various embodiments, the Wi-Fi module can be configured with slow-down functions to avoid interference with other wireless devices.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The LED lighting devices consistent with the present disclosure may integrate the control of lighting with the control of other appliances. For example, the LED lighting device may have preprogramed settings such as linking a command to turn a TV on with the control to turn-off or dim the lights in the room of the TV. In this example, a user may send a command to turn on a TV in room A using a smartphone to control the LED lighting device. The LED lighting device may include multiple lighting units in room A. The smartphone may transmit the command through a Wi-Fi router. The LED lighting device may receive the command through its Wi-Fi unit and convert the command to infrared signals. The LED lighting device may determine that the command to turn on the TV in room A triggers the command to turn the lights off in room A. The LED lighting device may turn off the lights in room A. The lights in room A may be LED lighting units controlled by the LED lighting device. The lights in room A may also be lights that are not a part of the LED lighting device. In another example, the LED lighting device may link a command to turning on an air conditioning unit with the function to turn on the lights in the area cooled or heated by the air conditioning unit.

The wireless LED lighting control system consistent with the present disclosure may also provide a user interface so that a user may set up logic rules linking certain controls of the lights and appliances. A user may set up logic rules linking certain controls of a first appliance to certain controls of a second appliance. For example, through the user interface, the user may program settings such as linking a command to turn on a TV with the control to turn off or dim the lights in the room of the TV. In another example, the user may link a command to turning an air conditioning unit with the control to turn on the lights in the area that is cooled or heated by the air conditioning unit.

Further, the wireless LED lighting control system consistent with the present disclosure may include multiple LED lighting devices. When receiving a control command, the wireless LED lighting control system may determine which LED lighting device needs to execute the command. For example, a user may use a user interface to send a command to turn on a fan in the garage. The wireless LED lighting control system may use a wireless router to send the command to the LED lighting device in the garage. The LED lighting device may receive the command (to turn the fan on) through the Wi-Fi unit and convert that command into infrared signals. The LED lighting device may then send the infrared signals to turn on the fan. The LED lighting device may also determine that a command to turn the fan on in the garage should trigger a command to turn the lights on in the garage. The LED lighting device may then send command to turn on the lights in the garage. The lights in the garage may be LED lighting units controlled by the LED lighting device. The lights in the garage may also be lights that are not a part of the LED lighting device.

What is claimed is:

1. An LED lighting device with lighting and appliance control capabilities, comprising:
   an LED lighting unit configured to emit light;
   an LED driving circuit configured to drive the LED lighting unit, the LED driving circuit being connected to the LED lighting unit;
   an infrared module configured to send infrared signals to an appliance; and
   a Wi-Fi module configured to receive and send data, wherein the Wi-Fi module is connected to the infrared module, and the Wi-Fi module sends received data to the infrared module;
   wherein a first command received by the Wi-Fi module and a second LED lighting device includes a linking control of the appliance within an infrared signal range of the infrared module and the second LED lighting device; and
   when the Wi-Fi module receives a second command that requires an adjustment of the appliance, the infrared module sends the infrared signals to the appliance to perform the adjustment, and the Wi-Fi module of the first LED lighting device sends a Wi-Fi signal to the second LED lighting device for adjusting the emitted light from the second LED lighting unit based on the linking control.

2. The LED lighting device according to claim 1, wherein the LED lighting device receives a command through the Wi-Fi module, converts the command to infrared signals, and sends the infrared signals to the appliance through the infrared module.

3. The LED lighting device according to claim 1, wherein the Wi-Fi module and the infrared module connect through an I2C, UART, SPI, or SDIO interface.

4. The LED lighting device according to claim 1, wherein the Wi-Fi module uses an external antenna or an internally integrated antenna.

5. The LED lighting device according to claim 1, wherein the Wi-Fi module connects the LED lighting device to the internet or a local area network.

6. The LED lighting device according to claim 1, wherein the Wi-Fi module acts as a wireless access point, a gateway, or a repeater.

7. The LED lighting device according to claim 1, wherein the Wi-Fi module works at 2.4 GHz or 5 GHz.

8. The LED lighting device according to claim 2, wherein the command received by the Wi-Fi module requires an adjustment of a first appliance, and the LED lighting device adjusts one or more LED lighting units based on the adjustment required by the received command.

9. An LED lighting control system with lighting and appliance control capabilities, comprising:
   a smart terminal configured to send commands to control LED lighting devices and appliances;
   one or more appliances configured to receive infrared control signals corresponding to the commands sent by the smart terminal through the LED lighting devices;
   one or more LED lighting devices configured to receive the commands sent by the smart terminal and convert the commands to the infrared control signals for the one or more appliances; and
   a Wi-Fi router configured to receive commands from the smart terminal and send received commands to the one or more LED lighting devices;

wherein a first command received by a first LED lighting device and a second LED lighting device includes a linking control of a first appliance within an infrared signal range of the first LED lighting device and the second LED lighting device; and when the first LED lighting device receives a second command that requires an adjustment of the first appliance, the first LED lighting device sends the infrared control signals to the first appliance to perform the adjustment, and the first LED lighting device sends a Wi-Fi signal to the second LED lighting device for adjusting emitted light from the second LED lighting device based on the linking control.

10. The LED lighting control system according to claim 9, each LED lighting device comprising:

an LED lighting unit configured to emit light;

an LED driving circuit configured to drive the LED lighting unit, the LED driving circuit being connected to the LED lighting unit; and a Wi-Fi module configured to receive and send data;

wherein each LED lighting device works as a network node, transmitting signals to other LED lighting devices within its Wi-Fi coverage range.

11. The LED lighting control system according to claim 10, wherein the smart terminal is a computer, a tablet, or a smart phone with wireless communication capacities and a user interface for entering data related to controlling lighting and appliances.

12. The LED lighting control system according to claim 10, wherein the one or more appliances is an air conditioning unit, a television, a DVD player, a set top box, a satellite receiver, a refrigerator, an oven, a dishwasher, or an electric fan.

13. A method for integrated lighting and appliance control implemented by an LED lighting device, comprising:

receiving a Wi-Fi command to control one or more appliances;

converting the Wi-Fi command to infrared signals or other control signals; and sending the infrared signals to the one or more appliances;

wherein a first command received by the LED lighting device and a second LED lighting device includes a linking control of a first appliance within an infrared signal range of the LED lighting device and the second LED lighting device; and the method further comprises:

receiving, by the LED lighting device, a second command that requires an adjustment of a first appliance, sending, by the LED lighting device, the infrared signals to the first appliance to perform the adjustment, and sending, by the LED lighting device, a Wi-Fi signal to the second LED lighting device for adjusting emitted light from the second LED lighting device based on the linking control.

14. The method according to claim 13, further comprising:

adjusting one or more LED lighting units in response to the received Wi-Fi command.

15. The LED lighting device according to claim 1, wherein a user interface is provided to allow a user to set up one or more logic rules of the linking control.

16. The LED lighting control system according to claim 10, the smart terminal is further configured to:

provide a user interface to allow a user to set up one or more logic rules of the linking control.

17. The method according to claim 13, further comprising:

providing a user interface to allow a user to set up one or more logic rules of the linking control.

18. The LED lighting device according to claim 1, wherein:

components of the second LED lighting device are the same as components of the LED lighting device.

19. The LED lighting control system according to claim 9, wherein:

the LED lighting control system comprises multiple LED lighting devices; and the Wi-Fi router is further configured to: after receiving a command from the smart terminal, select one of the multiple LED lighting devices for executing the command based on appliance information carried in the received command and location information of the multiple LED lighting devices; and send the received command to the selected LED lighting device.

* * * * *